United States Patent [19]

Drobina

[11] 4,293,362

[45] Oct. 6, 1981

[54] METHOD OF FORMING DECORATIVE PANELS

[76] Inventor: Dezso D. Drobina, #204 - 25 E. 12 Ave., Vancouver, British Columbia, Canada, V5T 2G6

[21] Appl. No.: 102,242

[22] Filed: Dec. 10, 1979

[51] Int. Cl.³ .......................... B27M 1/08; B32B 3/14
[52] U.S. Cl. .................. 156/264; 144/309 A; 144/309 Q; 144/315 R; 156/63; 156/265; 156/304.1; 428/47; 428/106
[58] Field of Search ............... 156/264, 63, 265, 299, 156/304, 560, 559, 558, 266; 144/309 P, 309 Q, 314 R, 315 R, 319, 309 A; 428/47, 106

[56] References Cited

U.S. PATENT DOCUMENTS

| 2,729,584 | 1/1956 | Foster | 156/304 X |
| 3,730,797 | 5/1973 | Jensen | 156/264 X |
| 3,969,558 | 7/1976 | Sadashige | 144/309 A |

FOREIGN PATENT DOCUMENTS 11977  3/1933  Australia .................. 144/315 R

Primary Examiner—Michael G. Wityshyn

[57] ABSTRACT

A method of forming decorative panels wherein a plurality of edged-glued thin wood strips are laid in side-by-side relationship until the glue is set to form a single composite sheet and then the sheet is cut into pieces, each piece having portions of a plurality of the strips, and the pieces then glued on a wooden backing sheet in edge-to-edge relationship to form a decorative panel.

2 Claims, 2 Drawing Figures

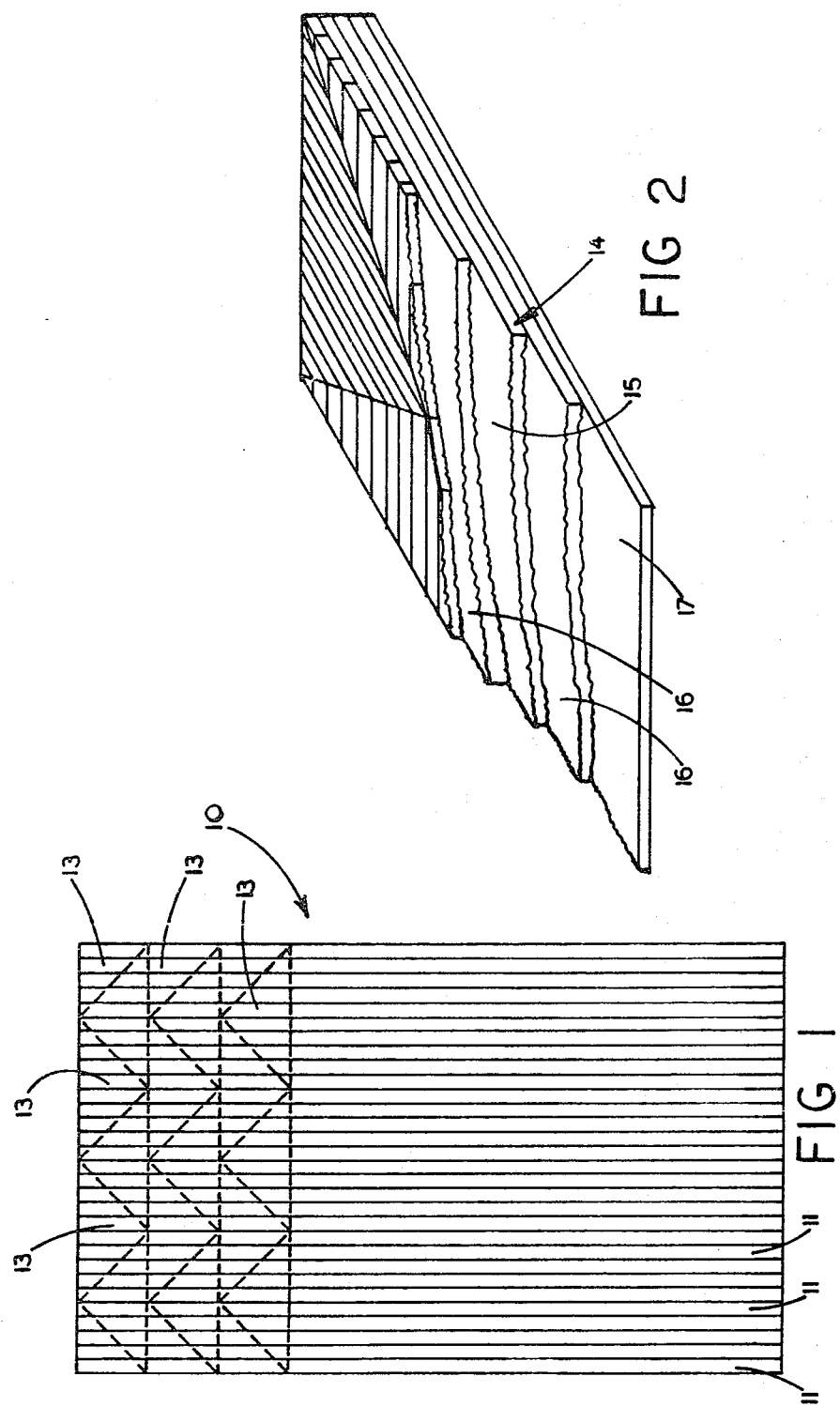

METHOD OF FORMING DECORATIVE PANELS

BACKGROUND OF THE INVENTION

1. Field of the Invention

This invention relates to forming of decorative veneer panels, and in particular to a method capable of mass production.

2. Prior Art

In the production of ornamental wooden surfaces on objects, the techniques employed in mosaic work and in-lay work require great expertise as the various wooden pieces must each, individually, be cut to shape and then carefully glued together, usually on a backing. The work is time consuming and is, therefore, costly and, consequently, is not suitable for mass production where those doing the work are not skilled artisans and where it is desired to provide ornamentally-surfaced wall panels, and the like.

SUMMARY OF THE INVENTION

The present invention provides a method for making decorative wooden panels which resemble mosaic or in-lay work which is suitable to be carried out by mass production techniques and which does not require the employment of highly trained artisans.

The present method generally embodies the making up of a composite sheet formed of long thin pieces of wood disposed and edge-glued together in side-by-side relationship. The sheet thus formed is then cut into a plurality of pieces, each of which contains portions of a plurality of the strips, and the pieces then arranged and glued in a desired pattern on a backing piece.

A detailed description following, related to the drawings, gives exemplification of method according to the invention which, however, is capable of expression in method other than those particularly described and illustrated.

DESCRIPTION OF THE DRAWINGS

FIG. 1 shows a composite sheet formed of strips of wood arranged and glued together in side-by-side relationship, FIG. 2 shows a portion of a finished panel, portions thereof being broken away for clarity.

DETAILED DESCRIPTION

Referring to the drawings, and in particular to FIG. 1, a composite sheet 10 is made up of a plurality of thin narrow wooden strips 11 which can, for instance, be eight feet in length, an inch in width and perhaps one-eighth inches in thickness. The strips, to enable mass production techniques to be carried out, should be all of the same width and the side edges thereof finished and trued in exact parallelism. Further, the strips can be made of different types of wood having different colours and different grains.

In forming the sheet 10, the strips are all machine edge-glued and are laid, by hand, in side-by-side parallelism on a flat bed and then pressed on the top and sides, and pressure maintained until the glue has set. This thus provides a composite sheet in which the majority of the glue is forced out between the abutting side edges of the strips to provide tight joints.

The composite sheet is then cut by die-cutting or sawing, and with the use of jigs, into pieces 13 of predetermined size and shape (shown in broken outline in FIG. 1), in which each piece incorporates a portion of a plurality of the strips.

Referring to FIG. 2, the pieces 13 are then arranged in a predetermined pattern on a backing member 14, which can be of laminated wood construction, the pieces being edge and back-glued and the entire panel then pressed and pressure thereon being maintained until the glue has set. The ornamental surface is then machine-sanded to remove excess glue and to true the surface.

In order that the panels so constructed are rendered substantially proof against warping, the laminated backing member should have a hard-wood center laminate 15 sandwiched between a pair of cores 16, the grain of each of which is perpendicular to that of the center board, and a back sheet 17, the grain of which extends perpendicular to the core laminate.

It is seen that with the method of construction proposed by the invention, manual or hand-work is minimized in that the wooden strips 11 are machine-formed and cutting of the composite sheets into various pieces can also be carried out by machine, rather than hand labour, so that the only hand-work necessary is firstly the laying of the strips prior to pressing and the fitting of the finished pieces together in a prearranged pattern.

I claim:

1. A method of forming decorative wooden panels comprising:
    (a) edge-gluing a plurality of long thin strips of wood in side-by-side relationship to form a single composite sheet,
    (b) cutting the sheet into pieces of predetermined size and shape wherein each piece has a portion of said plurality of strips,
    (c) gluing the pieces in edge-to-edge relationship in a predetermined pattern on a backing member, said backing member being of laminated wood construction with a central layer of said backing member being of hard wood with the grain of said hard wood oriented at 90° to the grain of the remaining core members.

2. A method as claimed in Claim 1 in which each of the strips is of the same width and thickness.

* * * * *